United States Patent [19]

Readman et al.

[11] Patent Number: 4,683,389
[45] Date of Patent: Jul. 28, 1987

[54] OIL SCAVENGE SYSTEM

[75] Inventors: John Readman; Timothy J. Bland, both of Rockford, Ill.

[73] Assignee: Sundstrand Corporation, Rockford, Ill.

[21] Appl. No.: 812,188

[22] Filed: Dec. 23, 1985

[51] Int. Cl.⁴ .......................... H02K 7/08; F01M 1/12
[52] U.S. Cl. ..................................... 310/62; 184/39.1; 184/11.2; 239/318; 310/90
[58] Field of Search ................ 184/6.13, 11.2, 39.1, 184/103.1; 239/318; 310/62, 90; 417/87, 151; 418/88

[56] References Cited

U.S. PATENT DOCUMENTS

| | | | |
|---|---|---|---|
| 2,022,642 | 11/1935 | Hueber et al. | 60/60 |
| 2,417,403 | 3/1947 | Zonis | 184/39.1 |
| 2,573,290 | 10/1951 | VanGuilder | 230/95 |
| 2,605,065 | 9/1952 | Douglas | 184/6.13 |
| 2,743,627 | 5/1956 | Christenson | 184/6.13 |
| 2,996,146 | 8/1961 | Beam, Jr. et al. | 184/6.13 |
| 3,291,051 | 12/1966 | Ekey | 417/83 |
| 3,551,073 | 12/1970 | Petrovits | 417/76 |
| 3,698,839 | 10/1972 | Distefano | 417/299 |
| 3,800,913 | 4/1974 | Schmitt | 184/6.13 |
| 4,396,848 | 8/1983 | Scheldorf et al. | 310/54 |
| 4,470,772 | 9/1984 | Gannaway | 417/368 |
| 4,480,967 | 11/1984 | Schulze | 417/368 |
| 4,647,805 | 3/1987 | Flygare et al. | 310/61 |

Primary Examiner—Patrick R. Salce
Assistant Examiner—D. L. Rebsch
Attorney, Agent, or Firm—Wood, Dalton, Phillips, Mason & Rowe

[57] ABSTRACT

An oil scavenge system for use in a generator or the like which includes a housing having a plurality of isolated compartments into which oil may leak from the coolant flow passages of the generator. A plurality of fluid jet pumps are mounted in respective internal cavities about the housing of the generator. At least one internal passageway in the housing communicates each isolated compartment with one of the fluid jet pumps, whereby oil leaking into a compartment can be withdrawn therefrom by the respective jet pump. An internal conduit in the housing delivers oil under pressure to each fluid jet pump for operating the pump. An internal flow passage in the housing from the jet pump returns the oil to an engine gearbox pump.

16 Claims, 5 Drawing Figures

OIL SCAVENGE SYSTEM

FIELD OF THE INVENTION

This invention generally relates to generators or the like, and more particularly, to an oil scavenge system for such machines.

BACKGROUND OF THE INVENTION

The cooling of various parts of dynamoelectric machines has long been recognized as being advantageous. By cooling various components, the capacity of a given machine is increased because the heat generated during operation which might otherwise destroy or damage the machine at a given capacity level is carried away by the coolant.

This increase in capacity is particularly advantageous in aircraft generators. In such a use, the weight of the generator is a substantial concern. Thus, for a desired capacity necessary to meet electrical consumption requirements on an aircraft, the weight of the generator may be minimized by increasing the effectiveness of its cooling system. For instance, an improved cooling system for an aircraft generator is shown in copending application Ser. No. 755,255, filed July 15, 1985 and assigned to the assignee of this invention.

Typical generators employed in aircraft are so-called "brushless" generators. They frequently include a stator which includes a main armature, an exciter field, and a permanent magnet generator armature. The rotor includes a permanent magnet field, an exciter armature and a main field winding. In addition, the rotor will include a full or a half wave rectifier, usually a full wave rectifier which interconnects the exciter armature and the main field winding to allow the former to energize the latter while at the same time rectifying the alternating current generated in the exciter armature to direct current before it is applied to the main field winding.

Such generators may have a relatively complex network of coolant passages throughout the generator housing between various compartments and areas about the various components of the generator, as described above. For instance, to adequately cool the rotor, it is necessary that both the exciter armature and the main field winding be cooled. It is also necessary to cool the rectifier. All of the coolant passages are provided with various types of seals to contain the flow of the oil within the coolant passages. The housing of the generator normally has several locations forming isolated compartments into which the seals are designed to prevent migration or leakage of the cooling oil. However, regardless of how efficient the seals may be designed, some cooling oil nevertheless leaks into the isolated compartments and, therefrom, to operative areas of the generator which can cause friction and a loss of efficiency. This is particularly true should oil leak into the "gap" between the armature and the rotor whereby the efficiency of the generator would be greatly reduced.

This problem is further magnified in aircraft generators which operate at high altitudes. As the altitude increases, the density of air decreases which, in essence, reduces the pressure in the isolated compartments or cavities of the generator. When the density of the air is reduced, any entrapped oil has a greater tendency to become particlized in the air and enhance the possibility of leakage between the operative components of the generator.

Heretofore, a plurality of individual, mechanical scavenge pumps have been used to withdraw oil which has leaked into respective compartments of the generator. However, as outlined above, the weight of aircraft generators is a substantial concern. Such mechanical scavenge pumps increase the weight, as well as the complexity and cost of the generator.

This invention is directed to solving these problems by providing a scavenge system which employs scavenge pumps that are lightweight, extremely simple, cost effective and, in fact, do not have any movable parts.

SUMMARY OF THE INVENTION

An object, therefore, of the invention is to provide a new and improved oil scavenge system for generators or the like. More specifically, the invention contemplates the novel use of fluid jet pumps for scavenging oil from generators or other dynamoelectric machines.

In the exemplary embodiment of the invention, the oil scavenge system is designed for use in a generator which includes a housing having a plurality of isolated compartments into which oil may leak from the coolant flow passages of the generator. A plurality of fluid jet pumps are mounted in respective internal cavities about the housing of the generator. At least one internal passageway in the housing communicates each isolated compartment with one of the fluid jet pumps, whereby oil leaking into a compartment can be withdrawn therefrom by the respective jet pump. An internal conduit in the housing is provided for delivering oil under pressure to each fluid jet pump for operating the pump. An internal flow passage in the housing is provided from the fluid jet pump for returning the oil to an engine gearbox pump.

Each fluid jet pump includes a divergent nozzle and opening means upstream of the divergent nozzle. The opening means leads to the respective passageway. An annular chamber surrounds the opening means and is in communication with the passageway for providing a collection chamber for oil from the respective isolated compartment.

It can be seen that the fluid jet pumps operate without any movable parts and can be considerably light in weight, much less complex and considerably less expensive than mechanical scavenge pumps which heretofore have been employed for the purposes contemplated herein.

Other objects, features and advantages of the invention will be apparent from the following detailed description taken in connection with the accompanying drawings.

DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

DETAILED DESCRIPTION OF THE PREFERRED EMBODIMENT

Figure 1:
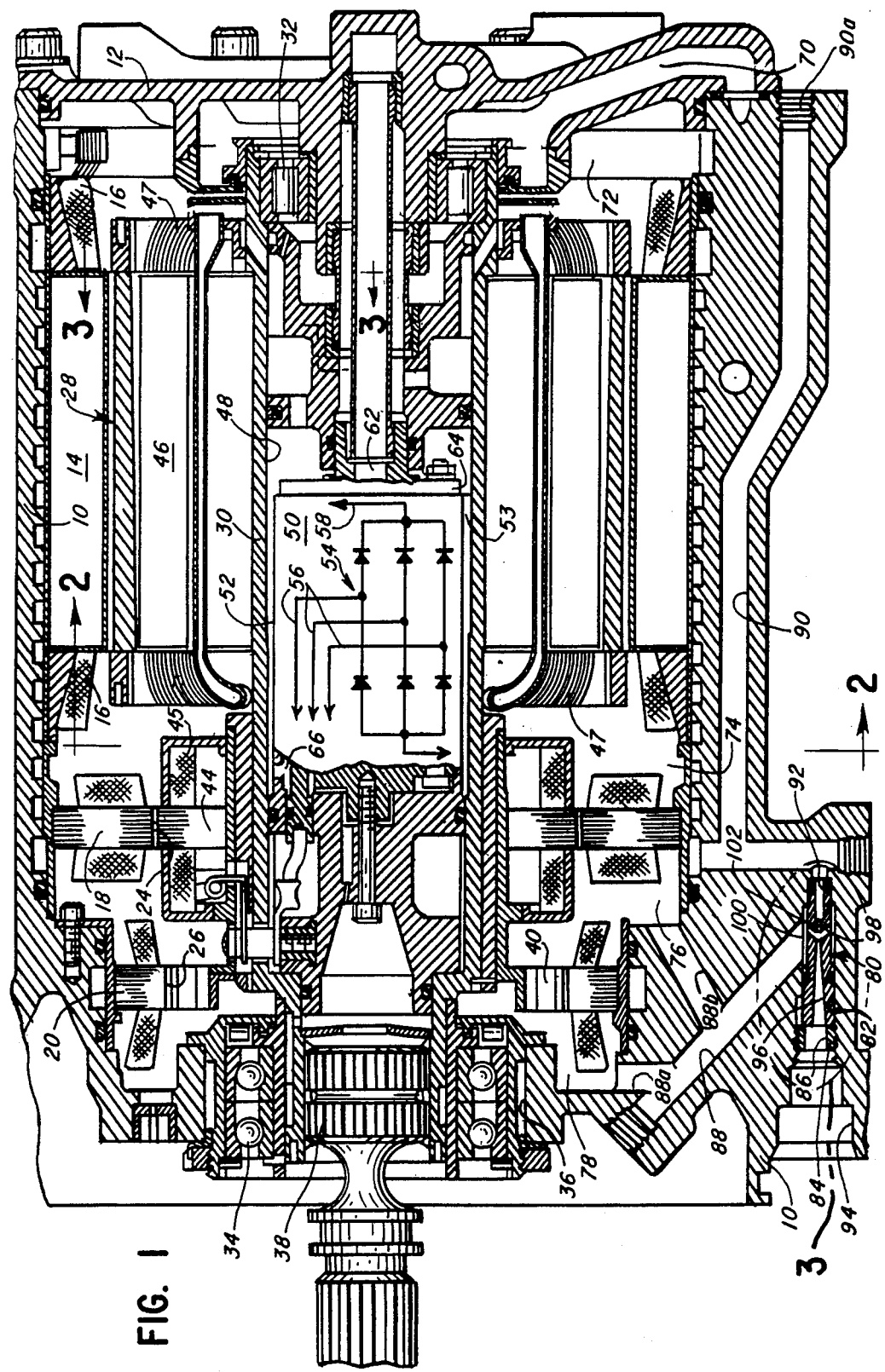
FIG. 1 is a central, axial section through a generator incorporating the concepts of the invention.

An exemplary embodiment of a generator made according to the invention is illustrated in the drawings. Referring to FIG. 1, the generator includes a generally cup-shaped housing 10 closed at one end by a cap 12. A stator is provided in housing 10 and includes a main armature 14 provided with electrical windings 16. The stator also includes an exciter field 18 and the armature of a permanent magnet generator or pilot armature 20.

Main armature 14 includes a central opening 22 while the exciter field includes a coaxial opening 24. Armature 20 for the permanent magnet generator includes a coaxial opening 26.

Within openings 22, 24 and 26 is a rotor, generally designated 28. The rotor includes a hollow shaft 30 journalled at one end by bearings 32 mounted on cap 12 and, at its opposite end, by bearings 34 mounted within an opening 36 in housing 10. A splined coupling 38 is adapted to be connected to a source of rotary power such as an engine gearbox for rotating rotor 28 within openings 22, 24 and 26.

About its periphery, shaft 30 mounts a series of permanent magnets 40 aligned with opening 26 for inducing current in armature 20. An exciter armature 44 is located on shaft 30 within opening 24 and includes windings 45 in which an alternating current, usually three phase, is induced as a result of conventional energization of exciter field 18 by current induced in armature 20 of the permanent magnet generator after suitable rectification. Rotor 28 includes a body of magnetizable material 46 located within opening 22 which may be conventionally arranged into a plurality of poles to receive windings 47, the turns of which are seen in FIG. 1.

The interior of hollow shaft 30 is designated 48, within which is a rectifier housing 50. The rectifier housing is spaced from the interior wall 48 to define an annulus 52, such spacing being accomplished by any suitable means as, for example, spacing legs 53 (only one of which is shown).

A conventional rectifier is shown schematically at 54 within rectifier housing 50. While the illustrated rectifier is a full wave rectifier, in some instances, a half wave rectifier could be utilized. In any event, rectifier 54 includes phase leads 56 which are connected appropriately to the exciter armature winding 46 and field leads 58 which are appropriately connected to the main field winding 47 of rotor 28. The actual physical construction of rectifier 54 may be conventional as is its connection to windings 45 and 47.

Housing 50 includes an oil or coolant inlet port 62 formed in a cap 64 at the right axial end of housing 50, as viewed in FIG. 1. At the opposite axial end of housing 50, the same includes one or more radially directed oil or coolant exit ports 66 which open to annular space 52 in close adjacency to exciter armature 46. In the usual case, the coolant will be an oil so that the same may additionally be employed for lubrication purposes.

This description will not be belabored to set forth the entire network of cooling passages throughout the generator for the cooling oil. Details thereof can be ascertained in the aforesaid copending application Ser. No. 755,255, which is incorporated herein by reference. Suffice it to say, a serial flow pattern for the coolant is defined with the coolant first cooling rectifier 54 and then windings 46, 48. The flow pattern provides for coolant flow through the interior of housing 50 in intimate contact with rectifier 54 to cool the same. The emergence of the coolant at the port or ports 66 in the immediate vicinity of exciter armature 44 into annulus 52 allows the coolant to absorb heat conducted to shaft 30 from both exciter armature 40 and the main field of the rotor. As the coolant flows from left to right as viewed in FIG. 1 through the annulus, additional heat conducted from the exterior wall of rectifier housing 50 is absorbed. The coolant ultimately enters conduits and passageways and absorbs more heat from the laminations that typically would be used in forming body 46 of magnetizable material as well as from windings 47 and then is returned to the interior of shaft 30 to ultimately exit into housing 10.

Dynamoelectric machines such as the generator described above are designed such that several compartments or cavities are formed within generator housing 10. For instance, FIG. 1 shows the generator described above and cavities or compartments 70, 72, 74, 76 and 78 can be seen. Cavity 70 is a bearing scavenge compartment and will naturally receive oil. However, cavities or compartments 72, 74, 76 and 78 should be free of any coolant or oil. To this end, the network or flow pattern of coolant passages described above are provided with various seals throughout the interior of housing 10 at many locations as shown in FIG. 1 to confine the coolant to its designed flow pattern. This is an ideal situation. However, some coolant nevertheless leaks past the appropriate seals and ends up in isolated compartments 72-78. The oil then can cause friction on the operative components of the generator, particularly in the "gap" between the armature and rotor, and reduce the efficiency of the generator. As stated in the Background Of The Invention, heretofore individual mechanical scavenge pumps have been used to scavenge oil from isolated cavities or compartments of the generator, such as compartments 72-78. Such mechanical scavenge pumps increase the weight, complexity and cost of the machine. The invention contemplates providing a fluid jet pump, generally designated 80 (FIG. 1), supplied with oil under pressure at high velocity to scavenge oil from each isolated compartment. Jet pump 80 as located in FIG. 1 is provided for scavenging oil from both compartments 76 and 78 within housing 10. Jet pumps 80 also are used in the scavenge system for the bearing compartments; such as compartment 70.

More particularly, jet pump 80 comprises a unitary structure which is disposed within an elongated internal cavity 82 in housing 10. The pump is maintained in position by a threaded stop 84 having a through passage 86.

Passageway means are provided in housing 10 communicating isolated compartments 76 and 78 with fluid jet pump 80. More particularly, a common passageway 88 has a branch passageway 88a leading to isolated compartment 78 and a branch passageway 88b leading to isolated compartment 76. Thereby, any oil leaking into compartments 76, 78 can be withdrawn therefrom by fluid jet pump 80.

An internal conduit 90 in housing 10 is provided for delivering oil under pressure to the entrance 92 of jet pump 80. The outer end 90a of conduit 90 can be connected through appropriate conduit means to an appropriate source of oil under pressure. A flow passage 94 leads away from jet pump 80 for returning the supplied oil, as well as any oil scavenged from compartments 76 and 78, to an engine gearbox pump (not shown). Therefore, it can be seen that a continuous flow of oil from the gearbox pump can be supplied through conduit 90, through fluid jet pump 80 and back through flow passage 94, with the jet pump being operative by the fluid flow to scavenge oil from isolated compartments 76, 78.

Fluid jet pump 80 and its operation will now be described. However, advanced reference can be made to the larger views of fluid jet pumps 80A-80C to better visualize the details. Specifically, fluid jet pump 80 includes a divergent diffuser or nozzle 96 which receives the oil under pressure from conduit 90 and entrance 92 of the jet pump. Radial opening means 98 are provided through the body of jet pump 80. Furthermore, an annular chamber 100 is formed about the jet pump, surrounding opening means 98 and in communication with passageway 88. The annular chamber provides a collection chamber for oil from isolated compartments 76, 78.

In operation, the oil supplied under pressure, from conduit 90, enters fluid jet nozzle at entry 92, and passes through a small orifice 102 upstream of divergent diffuser or nozzle 96. Any oil present in annular chamber 100 is entrained in the oil stream emanating from orifice 102 and passes into divergent diffuser 96 where the velocity of the oil reduces and the velocity head is converted into pressure. The oil from the jet pump then is returned through flow passage 94 to the engine gearbox pump. In essence, orifice 102 converts inlet pressure to dynamic pressure (i.e. velocity). Secondary or scavenge flow is entrained by a momentum interchange with the high velocity jet. As the fluid passes into the divergent nozzle, it experiences a sudden expansion to diffuse the recovering dynamic pressure.

Preferably, each of bearing compartment 70 and isolated compartments 72 and 74 also have their individual fluid jet pumps. The reason for preferably providing a plurality of fluid jet pumps, one for each compartment or adjacent compartments, relates to the nature of using the generator in aircraft applications. Obviously, the jet pump will withdraw lighter or less viscous air before it will withdraw heavier or greater viscous oil. If a single pump is connected to plural isolated compartments, and the aircraft assumes a different attitude, a single jet pump may simply withdraw air from one compartment without withdrawing oil from another compartment at a different attitude.

Figure 2:
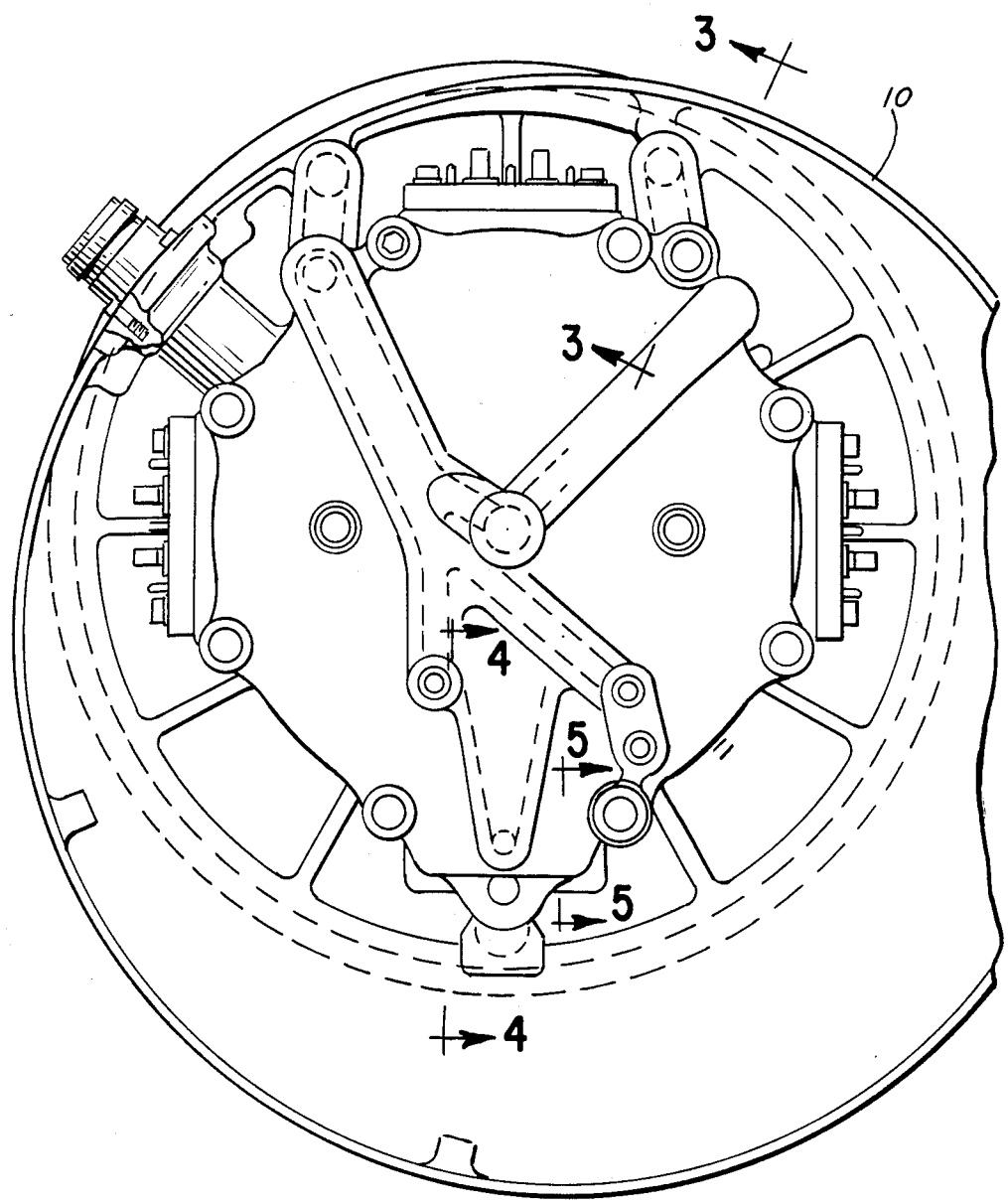
FIG. 2 is an end elevation of the generator, the right-hand end as viewed in FIG. 1.
Figure 3:
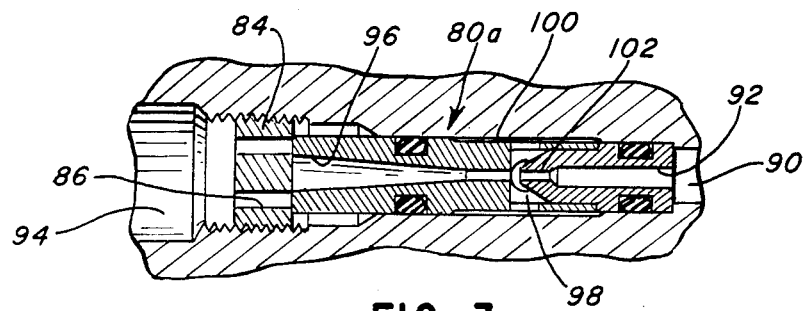
FIG. 3 is an enlarged section through a fluid jet pump located along line 3—3 of FIG. 2.
Figure 4:
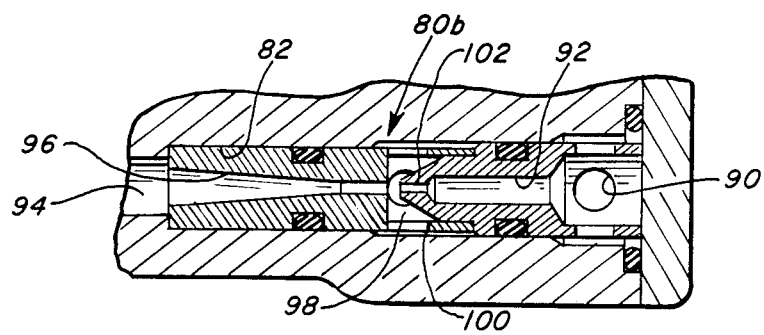
FIG. 4 is an enlarged section through a fluid jet pump located along line 4—4 of FIG. 2.
Figure 5:
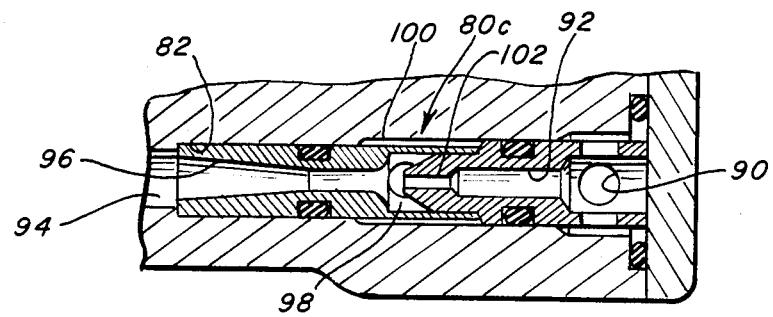
FIG. 5 is an enlarged section through a fluid jet pump located along line 5—5 of FIG. 2.

To this end, and referring to FIGS. 2-5, a plurality of fluid jet pumps, generally designated 80A, 80B and 80C are shown in FIGS. 3-5, respectively, corresponding to their locations taken from FIG. 2 in order to independently scavenge compartments 70-74. Like numerals have been applied to the components of fluid jet pumps 80A-80C in FIGS. 3-5, respectively, corresponding to the components of fluid jet pump 80 described in relation to FIG. 1. Appropriate conduits, similar to conduit 90, are provided in housing 10 to deliver oil under pressure to fluid jet pumps 80A-80C, and from the same source as supplying oil under pressure to conduit 90. Similarly, each fluid jet pump 80A-80C have exit ends leading to flow passages 94 for returning the oil to the engine gearbox pump.

From the foregoing, it can be seen that a new and improved scavenge system has been provided for use in generators or the like which include a plurality of isolated compartments into which oil may leak from the coolant flow passages of the generator. The fluid jet pumps are extremely simple and, in fact, do not even have any movable parts. The pumps are considerably lighter in weight and significantly more cost effective than mechanical scavenge pumps heretofore used for the purposes intended herein.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

We claim:

1. In a generator which includes a housing having a plurality of isolated compartments into which oil may leak from the coolant flow passages of the generator, an oil scavenge system comprising:

a plurality of fluid jet pumps mounted internally of the housing integral therewith;

passageway means formed by flow passages in the housing communicating each isolated compartment with one of the fluid jet pumps whereby oil leaking into a compartment can be withdrawn therefrom by the respective fluid jet pump; and conduit means formed by flow passages in the housing for delivering fluid under pressure to the jet pumps for operating the pumps.

2. The scavenge system of claim 1 wherein each fluid jet pump includes a divergent diffuser nozzle.

3. The scavenge system of claim 2 wherein the fluid jet pump includes opening means upstream of the diffuser nozzle, the opening means leading to the respective passageway means.

4. The scavenge system of claim 3 wherein the fluid jet pump includes an annular chamber surrounding the opening means and in communication with the passageway means, the annular chamber providing a collection chamber for oil from the respective isolated compartment.

5. The scavenge system of claims 1 or 4, including a flow passage from the diffuser nozzle for returning the oil to an engine gearbox pump.

6. The scavenge system of claims 1 or 4 wherein said conduit means supplies oil to the fluid jet pumps for operating the same.

7. The scavenge system of claims 1 or 4 wherein the fluid jet pumps are mounted in internal cavities in the housing of the generator.

8. A scavenge system for a generator or the like, which includes a housing having an isolated compartment into which coolant oil may leak from the cooling passages of the generator, comprising a fluid jet pump mounted internally of the housing in communication with the isolated compartment for withdrawing therefrom oil leaking thereinto, and flow passage means in the housing for delivering oil under pressure to the jet pumps for operating the pump.

9. In a generator which includes a housing having a plurality of isolated compartments into which oil may leak from the coolant flow passages of the generator, an oil scavenge system comprising:

a plurality of fluid jet pumps mounted in respective internal cavities about the housing of the generator;

at least one internal passageway in the housing communicating each isolated compartment with one of the fluid jet pumps whereby oil leaking into a compartment can be withdrawn therefrom by the respective jet pump;

an internal conduit in the housing for delivering oil under pressure to each fluid jet pump for operating the pump; and an internal flow passage in the housing from the fluid jet pump for returning the oil to an engine gearbox pump.

10. The scavenge system of claim 9 wherein each fluid jet pump includes a divergent diffuser nozzle.

11. The scavenge system of claim 10 wherein the fluid jet pump includes opening means upstream of the diffuser nozzle, the opening means leading to the respective passageway means.

12. The scavenge system of claim 11 wherein the fluid jet pump includes an annular chamber surrounding the opening means and in communication with the passageway means, the annular chamber providing a collection chamber for oil from the respective isolated compartment.

13. The scavenge system of claim 8 wherein the fluid jet pump includes a divergent diffuser nozzle.

14. The scavenge system of claim 13 wherein the fluid jet pump includes opening means upstream of the diffuser nozzle, the opening means leading to the passage means.

15. The scavenge system of claim 14 wherein the fluid jet pump includes an annular chamber surrounding the opening means and in communication with the passageway means, the annular chamber providing a collection chamber for oil from the respective isolated compartment.

16. The scavenge system of claims 8 or 15, including a flow passage from the diffuser nozzle for returning the oil to an engine gearbox pump.

* * * * *